(Model.)

W. C. KOWNOVER.
NUT AND BOLT LOCK.

No. 250,079.                    Patented Nov. 29, 1881.

Witnesses:
George Ford
A. McDonald

William C. Kownover
Inventor.

UNITED STATES PATENT OFFICE.

WILLIAM C. KOWNOVER, OF GRANGER, INDIANA.

NUT AND BOLT LOCK.

SPECIFICATION forming part of Letters Patent No. 250,079, dated November 29, 1881.

Application filed July 19, 1881. (Model.)

*To all whom it may concern:*

Be it known that I, WILLIAM C. KOWN-OVER, a citizen of the United States, residing at Granger, in the county of St. Joseph and State of Indiana, have invented a new and useful Nut-Lock, of which the following is a specification.

My invention relates to improvements in nut-locks, by which nuts and bolts of fish-joints on iron rails lying adjacent to each other, where the head of one meets the foot of the other, as railroad or other tracks, are held firmly in place.

My invention is a T-cap-nut lock; and it consists of a bar of iron constructed with flanges, apertures for the passage of bolts, and nut-sockets in one piece, applied by setting the same on a series of bolt-nuts, and is held in place by its own weight and by wires run through holes for that purpose in the projections of two or more of the sockets.

The object of my invention is to prevent the nuts from turning on the bolts of an ordinary fish-joint of a railroad or other track where the rails are joined at their ends, and to prevent the nuts from turning on the bolts fastening the rails at railroad-crossings. I attain these objects by the device illustrated in the accompanying drawings, in which—

Figure 1:
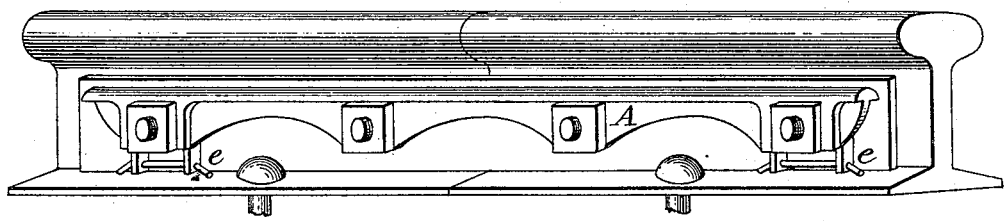
Figure 2:
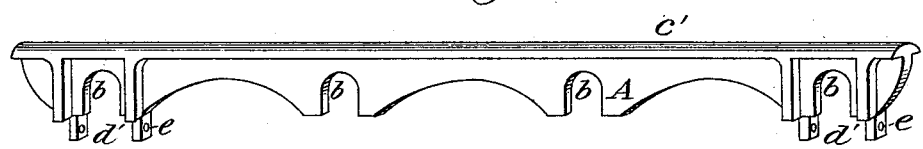
Figure 3:
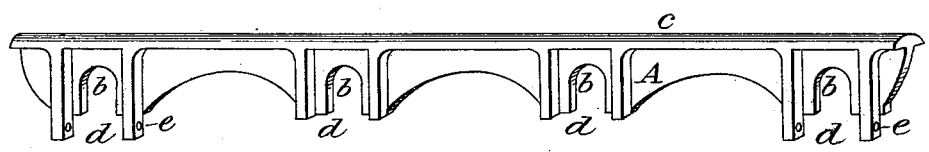

Figure 3 is an inside view of the device mentioned before applied to the bolt-nuts. Fig. 2 is an outside view of the same device; and Fig. 1 is a view of an ordinary fish-joint of a railroad-track, with the same device applied in the manner intended.

Similar letters refer to similar parts throughout the several views.

The bar A, of iron, with apertures $b$ for the passage of bolts, flanges $c$ and $c'$, and nut-sockets $d$ and $d'$ on the inner and outer sides thereof, are in one piece, the sockets $d$ and $d'$ extending below the flanges $c$ and $c'$ far enough to inclose the nuts. The sockets $d$ on the inner and $d'$ on the outer sides of the bar A are of sufficient size to inclose the nuts on three sides or edges. The sockets $d$ on the inner side of the bar A receive the nuts on the bolts passing through the rails and fish-plates. The sockets $d$ and flange $c$ prevent the nuts from turning on the bolts.

On the outer side of the bar A is a flange, $c'$, and two or more sockets, $d'$. The sockets $d'$ receive the nuts on the end of the bolts passing through the rails and fish-plates. The flange $c'$ and sockets $d'$ prevent the nuts at the end of the bolts from turning on the bolts. The sockets $d$ and $d'$, flanges $c$ and $c'$, and shoulder at inner part of the sockets hold the nuts firmly in place. To further assist in holding the bar A in place, the projections or lower ends, $e$, of two or more of the sockets below the nuts may be pierced and a wire run through the holes and bent sufficiently to prevent its coming out.

Having fully described my invention, what I desire to claim and secure by Letters Patent is—

1. A bar of iron, A, constructed with flanges $c$ and $c'$ and nut-sockets $d$ and $d'$, in one piece, substantially as described, for the purposes hereinbefore set forth.

2. The combination, with the ordinary fish-plates, bolts, and nuts in common use, of a bar, A, having flanges $c$ and $c'$ and nut-sockets $d$ and $d'$, and pierced with holes at lower ends, $e$, substantially as described, for the purposes hereinbefore set forth.

WILLIAM C. KOWNOVER.

Witnesses:
HARRY J. KELLOGG,
GEO. FORD.